W. E. POOLE.
STORAGE BATTERY.
APPLICATION FILED MAY 23, 1914.

1,115,018.        Patented Oct. 27, 1914.

Witnesses:
Robert H. Weir
Arthur W. Carlson

Inventor
William E. Poole
James R. Offield Atty

UNITED STATES PATENT OFFICE.

WILLIAM E. POOLE, OF CHICAGO, ILLINOIS, ASSIGNOR TO REX BATTERY COMPANY, OF CHICAGO, ILLINOIS, A CORPORATION OF ILLINOIS.

STORAGE BATTERY.

1,115,018. Specification of Letters Patent. Patented Oct. 27, 1914.

Application filed May 23, 1914. Serial No. 840,438.

*To all whom it may concern:*

Be it known that I, WILLIAM E. POOLE, a citizen of the United States, and a resident of Chicago, in the county of Cook and State of Illinois, have invented certain new and useful Improvements in Storage Batteries, of which the following is a specification.

My invention relates to improvements in storage batteries and particularly to improved means for venting and at the same time preventing the electrolyte from running of the vent opening when the storage battery is in any tilted position that it might ordinarily assume under general conditions.

In my application, Ser. No. 819,875, filed Feb. 20th, 1914, I have shown a venting arrangement for storage batteries designed to prevent spilling of the electrolyte when the storage battery is tilted upon its long axis. The construction therein shown would permit of the spilling of the electrolyte upon the tilting of the storage battery on its short axis to any great degree.

The object of my present invention as herein described, is to provide a vent arrangement whereby the battery may be tilted upon its long or short axis without the electrolyte running through the vent opening.

Figure 1:
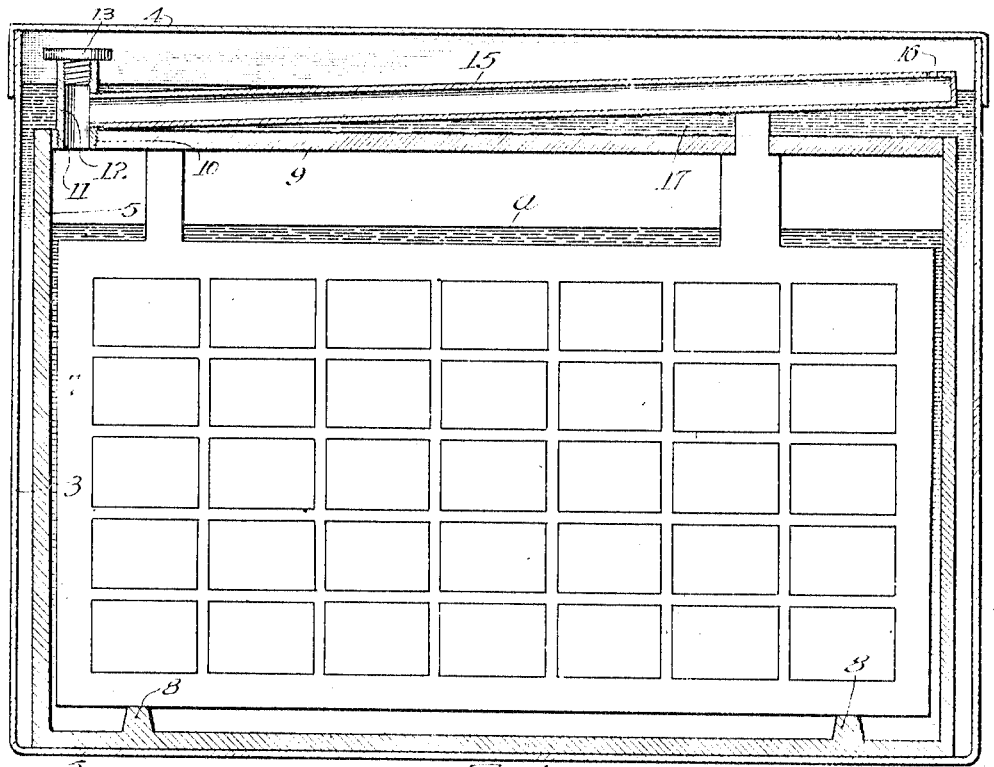
Figure 2:
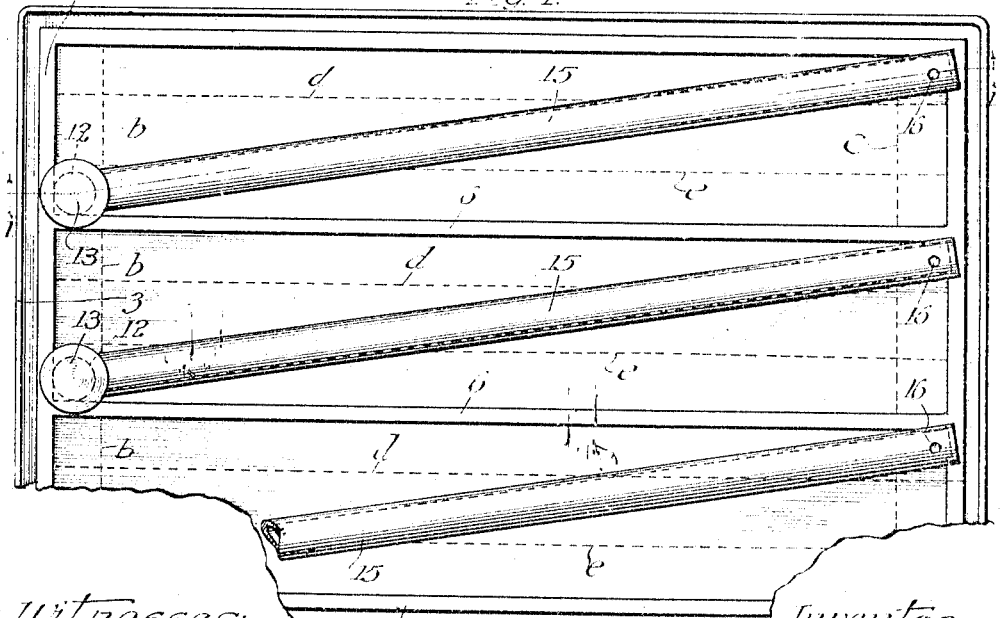

In the accompanying drawing Figure 1 is a vertical sectional view of the line 1—1 of Fig. 2. Fig. 2 is a plan view of the battery in its casing with the casing removed and parts being broken away.

Referring now more particularly to the drawings, the containing case or housing 3 is preferably of sheet metal and is provided with a sheet metal cover 4. Within the casing is a battery jar 5 of glass, rubber or other insulating material and is sub-divided into battery cells by vertical partition walls 6. In each cell are a suitable number of electrode plates 7 mounted on supporting ridges 8 on the bottom wall of the cell 5. Each cell cover 9 has a threaded opening 10 near one corner of the cell for receiving the threaded flange 11 of the hollow plug 12, herein shown as a filler plug, that is provided with a cap 13 having a threaded connection with the plug 12. Each plug is provided with a lateral opening 14 for receiving one end of a vent duct or tube 15 that is provided at its end with a vent outlet 16 opening upwardly.

The cells 5 containing the electrode plates are adapted to contain a sufficient amount of acid or electrolyte to cover the electrode plates therein so that the acid line in each one, when the battery is standing on its base and is in a horizontal position, is at the level indicated at (*a*), and the gases will rise into the plug 12 and thence through the vent tube 15 escaping through the opening 16 therein. When the battery is tilted upon its long axis so that the end of the casing 3 adjacent the vent opening 16 is down, the level of the electrolyte within the cells will be below the plug 12 as indicated by the electrolyte level line (*b*) and when tilted in the opposite direction so that the end of the casing adjacent to the plug 12 is down, the level of the electrolyte will be below the vent opening 16 as indicated by the level line (*c*). In both instances the electrolyte will not flow through the vent opening 16.

In case the battery is tilted upon its short axis so as to lie upon one side, the electrolyte level will be along the lines indicated at (*d*). When tilted to the other side the electrolyte level will be along the lines indicated at (*e*). On the level (*d*) the vent opening 16 is above the level of the electrolyte and when on the level (*e*) the plug opening is above the level of the electrolyte so that the electrolyte cannot escape.

In order to better protect the vent tubes and to seal the battery, some suitable composition 17 may be poured into the casing around the battery jar and over the cell covers and to a level below the vent opening 16. This composition, after hardening, will effectively seal the battery and holds the vent tube securely in place but permits however, the removal of the cap 13.

Having now described my invention I claim:

1. In a storage battery, an electrolyte containing receptacle, a cover therefor, a plug extending from said cover and a vent tube communicating with said plug extending slantingly upward therefrom and diagonally across said receptacle and having a vent opening adjacent its highest end.

2. In a storage battery, an electrolyte containing receptacle, a cover therefor, a plug extending from said cover near one end, and a vent tube in communication with said plug and extending upwardly and diagonally across said receptacle and having a vent opening adjacent its highest end.

3. In a storage battery, an electrolyte containing receptacle, a cover therefor, a plug extending from said cover at one side thereof, and a vent tube communicating with said plug and extending diagonally across said receptacle to the side opposite said plug and having a vent opening adjacent its free end.

WILLIAM E. POOLE.

Witnesses:
  SADIE M. RYAN,
  JAMES R. OFFIELD.